(12) United States Patent
Cheng et al.

(10) Patent No.: US 9,871,380 B1
(45) Date of Patent: Jan. 16, 2018

(54) METHODS AND APPARATUS TO PROTECT SOLAR POWER PLANTS

(71) Applicant: CyboEnergy, Inc., Rancho Cordova, CA (US)

(72) Inventors: George Shu-Xing Cheng, Folsom, CA (US); Steven L. Mulkey, Cameron Park, CA (US)

(73) Assignee: CYBOENERGY, INC., Rancho Cordova, CA (US)

( * ) Notice: Subject to any disclaimer, the term of this patent is extended or adjusted under 35 U.S.C. 154(b) by 13 days.

(21) Appl. No.: 14/997,990

(22) Filed: Jan. 18, 2016

Related U.S. Application Data

(62) Division of application No. 13/844,484, filed on Mar. 15, 2013, now Pat. No. 9,240,112.

(51) Int. Cl.
| | | |
|---|---|---|
| *H02J 7/34* | (2006.01) | |
| *H02J 1/10* | (2006.01) | |
| *H02J 3/38* | (2006.01) | |
| *H02J 1/00* | (2006.01) | |
| *H02J 3/00* | (2006.01) | |
| *H02J 7/00* | (2006.01) | |
| *G06K 9/00* | (2006.01) | |
| *H04N 7/18* | (2006.01) | |
| *H02M 3/04* | (2006.01) | |
| *H02M 7/04* | (2006.01) | |
| *H02M 7/44* | (2006.01) | |

(52) U.S. Cl.
CPC .......... *H02J 3/383* (2013.01); *G06K 9/00771* (2013.01); *H02M 3/04* (2013.01); *H02M 7/04* (2013.01); *H02M 7/44* (2013.01); *H04N 7/188* (2013.01)

(58) Field of Classification Search
USPC .......................................................... 307/52
See application file for complete search history.

(56) References Cited

U.S. PATENT DOCUMENTS

| | | | |
|---|---|---|---|
| 8,786,133 B2 | 7/2014 | Cheng et al. | |
| 8,994,218 B2 | 3/2015 | Cheng et al. | |
| 9,006,934 B2 * | 4/2015 | Kozakai | H03F 1/565 307/104 |
| 9,252,628 B2 * | 2/2016 | Leabman | H02J 7/025 |
| 9,450,449 B1 * | 9/2016 | Leabman | H04B 5/0037 |
| 9,571,974 B2 * | 2/2017 | Choi | H04W 4/023 |
| 2011/0206369 A1 * | 8/2011 | Goldner | H04B 10/85 398/25 |
| 2011/0260866 A1 * | 10/2011 | Avrutsky | H01L 31/02021 340/568.1 |
| 2012/0212065 A1 | 8/2012 | Cheng et al. | |
| 2012/0235631 A1 | 9/2012 | Nakashima et al. | |
| 2012/0259437 A1 | 10/2012 | Cheng et al. | |
| 2012/0313443 A1 | 12/2012 | Cheng et al. | |
| 2012/0319495 A1 | 12/2012 | Muller et al. | |

(Continued)

*Primary Examiner* — Adam Houston
(74) *Attorney, Agent, or Firm* — Donald E. Stout; Stout, Uxa & Buyan, LLP

(57) ABSTRACT

A method and apparatus is disclosed that can monitor the solar power inverters in real-time both day and night, and generate surveillance alarms and actions when a solar power inverter is removed or disconnected from the AC powerline for unknown reasons. It offers a low cost and reliable surveillance means to help guard a residential-scale, commercial-scale, or utility-scale solar power system in real-time at all times.

4 Claims, 7 Drawing Sheets

(56) References Cited

U.S. PATENT DOCUMENTS

| | | | |
|---|---|---|---|
| 2013/0002031 A1 | 1/2013 | Mulkey et al. | |
| 2013/0222144 A1* | 8/2013 | Hadar | G08B 13/1409 340/635 |
| 2014/0008993 A1* | 1/2014 | Leabman | H02J 17/00 307/104 |
| 2014/0063662 A1* | 3/2014 | Scott | G08B 13/22 361/42 |
| 2014/0252862 A1 | 9/2014 | Cheng et al. | |
| 2014/0354221 A1* | 12/2014 | Leabman | H01F 38/14 320/108 |
| 2015/0022009 A1* | 1/2015 | Leabman | H02J 7/025 307/104 |
| 2015/0333529 A1* | 11/2015 | Leabman | H02J 50/40 307/104 |
| 2016/0099601 A1* | 4/2016 | Leabman | H02J 50/40 307/104 |
| 2016/0099602 A1* | 4/2016 | Leabman | H02J 7/025 307/104 |
| 2016/0099609 A1* | 4/2016 | Leabman | H02J 50/40 307/104 |
| 2016/0099610 A1* | 4/2016 | Leabman | H02J 17/00 307/104 |
| 2016/0099612 A1* | 4/2016 | Leabman | H02J 50/40 307/104 |
| 2016/0099755 A1* | 4/2016 | Leabman | H04B 5/0037 307/104 |
| 2016/0099756 A1* | 4/2016 | Leabman | H04B 5/0037 307/104 |
| 2016/0099757 A1* | 4/2016 | Leabman | H04B 5/0037 307/104 |
| 2016/0099758 A1* | 4/2016 | Bell | H02J 7/0027 307/104 |
| 2016/0164295 A1* | 6/2016 | Cheng | H02J 3/38 307/22 |
| 2016/0191121 A1* | 6/2016 | Bell | H04B 5/0037 307/104 |
| 2016/0226254 A1* | 8/2016 | Cheng | H02J 3/383 |
| 2016/0241039 A1* | 8/2016 | Cheng | H02J 3/383 |
| 2016/0329857 A1* | 11/2016 | Du | H02S 30/10 |
| 2017/0012581 A1* | 1/2017 | Estes | H01L 31/02021 |

* cited by examiner

METHODS AND APPARATUS TO PROTECT SOLAR POWER PLANTS

This U.S. Utility Patent Application is a divisional application under 35 U.S.C. 120 of commonly assigned U.S. patent application Ser. No. 13/844,484 entitled Online Surveillance System to Protect Solar Power Plants, filed on Mar. 15, 2013, the contents of which are expressly incorporated herein by reference in their entirety.

The subject of this patent relates to surveillance of solar power inverters, systems, and plants. More particularly, this patent relates to a method and apparatus that can monitor the solar power inverters in real-time both day and night, and generate surveillance alarms and actions when a solar power inverter is removed or disconnected from the AC powerline. It offers a low cost and reliable online surveillance means to help guard a residential-scale, commercial-scale, or utility-scale solar power system in real-time 24 hours a day all year round.

The solar power industry has been growing rapidly. Solar power plants, especially those utility-scale ones, are often located in rural areas covering a large expanse of land. If not well guarded, a solar power plant can be an easy target for vandalism, which can result in big losses in equity and revenue. In order to protect a solar power plant, people typically build fences, install surveillance cameras, and hire security guards to guard the property. All these efforts can be costly.

In the U.S. patent application Ser. No. 12/837,162, the entirety of which is hereby incorporated by reference, we described the novel Smart and Scalable Power Inverters and the unique scalable design so that the DC to AC power inversion system can include as few as one inverter and one DC source, up to a selected number of inverters and multiple DC sources. A number of smart single-input, dual-input, triple-input, quad-input, and multiple-input power inverters in a mixed variety can easily connect to single, dual, triple, quad, and multiple DC power sources, invert the DC power to AC power, and daisy chain together to generate a total power, which is equal to the summation of the AC power supplied by each smart and scalable power inverter.

In the U.S. patent application Ser. No. 13/397,402, the entirety of which is hereby incorporated by reference, we described the Scalable and Redundant Mini-Inverters that have double, triple, or quadruple redundant capabilities so that the Mini-Inverters can work in a harsh environment for a prolonged period of time. A number of regular, redundant, triple redundant, or quadruple redundant Mini-Inverters with one, two, three, or multiple input channels in a mixed variety can easily connect to one, two, three, or multiple DC power sources such as solar PV modules, invert the DC power to AC power, and daisy chain together to generate AC power to feed the power grid.

In the U.S. patent application Ser. No. 13/493,622, the entirety of which is hereby incorporated by reference, we described the Smart and Scalable Off-Grid Mini-Inverters that not only have the key scalable and redundant features as described in U.S. patent application Ser. No. 12/837,162 and Ser. No. 13/397,402, but can also supply power to electrical devices that are not connected to the power grid including motors, pumps, fans, lights, appliances, and homes.

In the U.S. patent application Ser. No. 13/537,206, the entirety of which is hereby incorporated by reference, we described an enclosure design to accommodate and support the unique features and capabilities of the Smart and Scalable Power Mini-Inverters that have multiple input channels, and a messaging system using LEDs (light-emitting diodes) mounted on the enclosure to indicate the system status of the Smart and Scalable Mini-Inverters.

In the U.S. patent application Ser. No. 13/789,637, the entirety of which is hereby incorporated by reference, we described a method and apparatus for maximizing power production for solar power systems when there is low sunlight during sunrise, sunset, clouding, partial shading, and other low irradiance conditions. A multiple-channel solar power Mini-Inverter can work in the low power mode when there is low sunlight, take power from one solar panel to supply DC power to its internal electronic circuits, and also invert the DC power from the remaining connected solar panels to AC power feeding to the electric grid or powering AC loads.

In this patent, we introduce a method and apparatus that can monitor the solar power inverters and AC powerlines at all times, and generate surveillance alarms and actions when a solar power inverter is removed or disconnected from the AC powerline.

Figure 4:
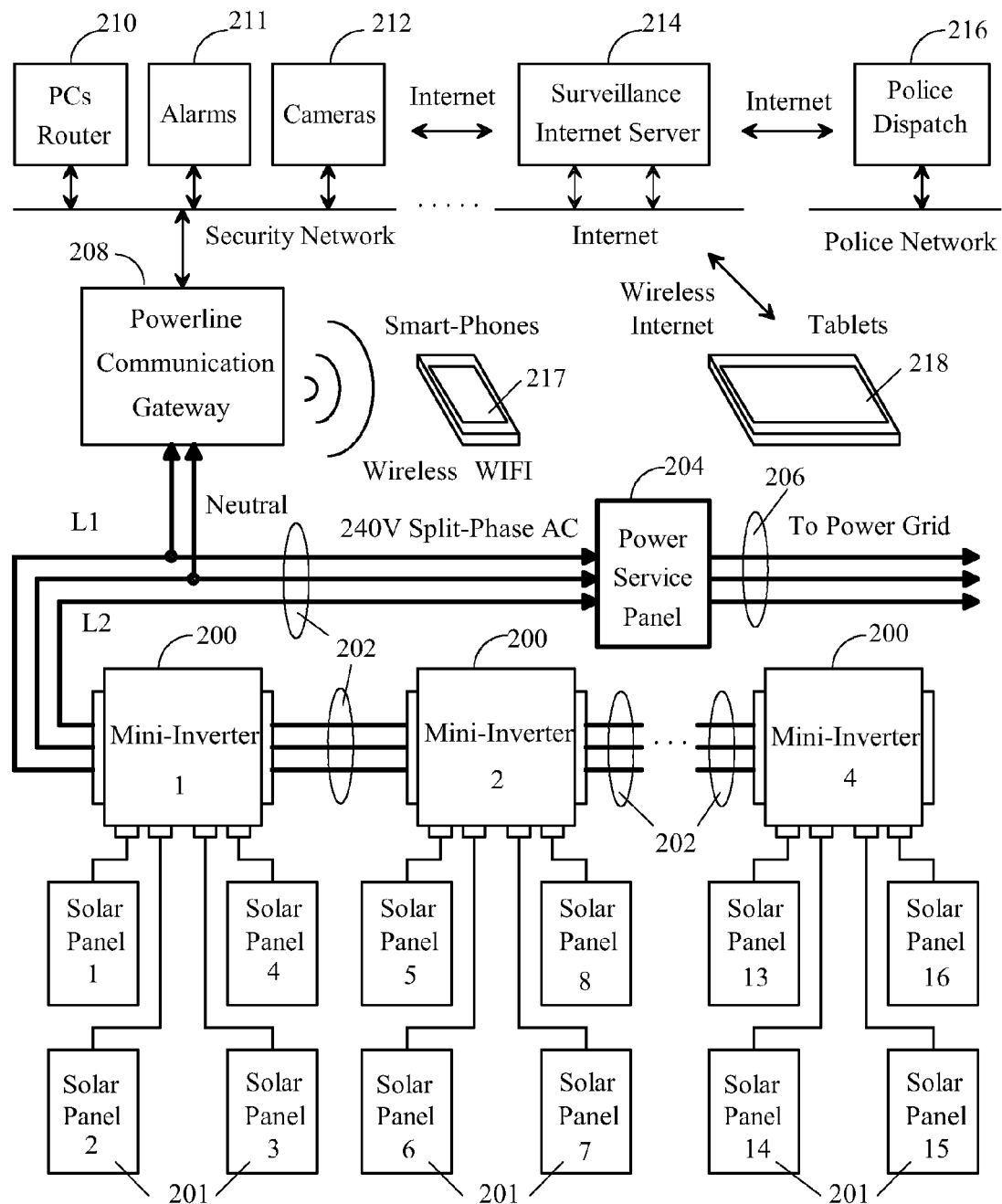

FIG. 4 is a block diagram illustrating a residential-scale solar power system where four 4-channel solar power Mini-Inverters daisy chain, each of which inverts the DC power from the solar panels to AC power feeding the electric grid, and also communicates with a surveillance system through a powerline communication gateway over the AC powerline to report its status in real-time at all times according to an embodiment of this invention.

Figure 5:
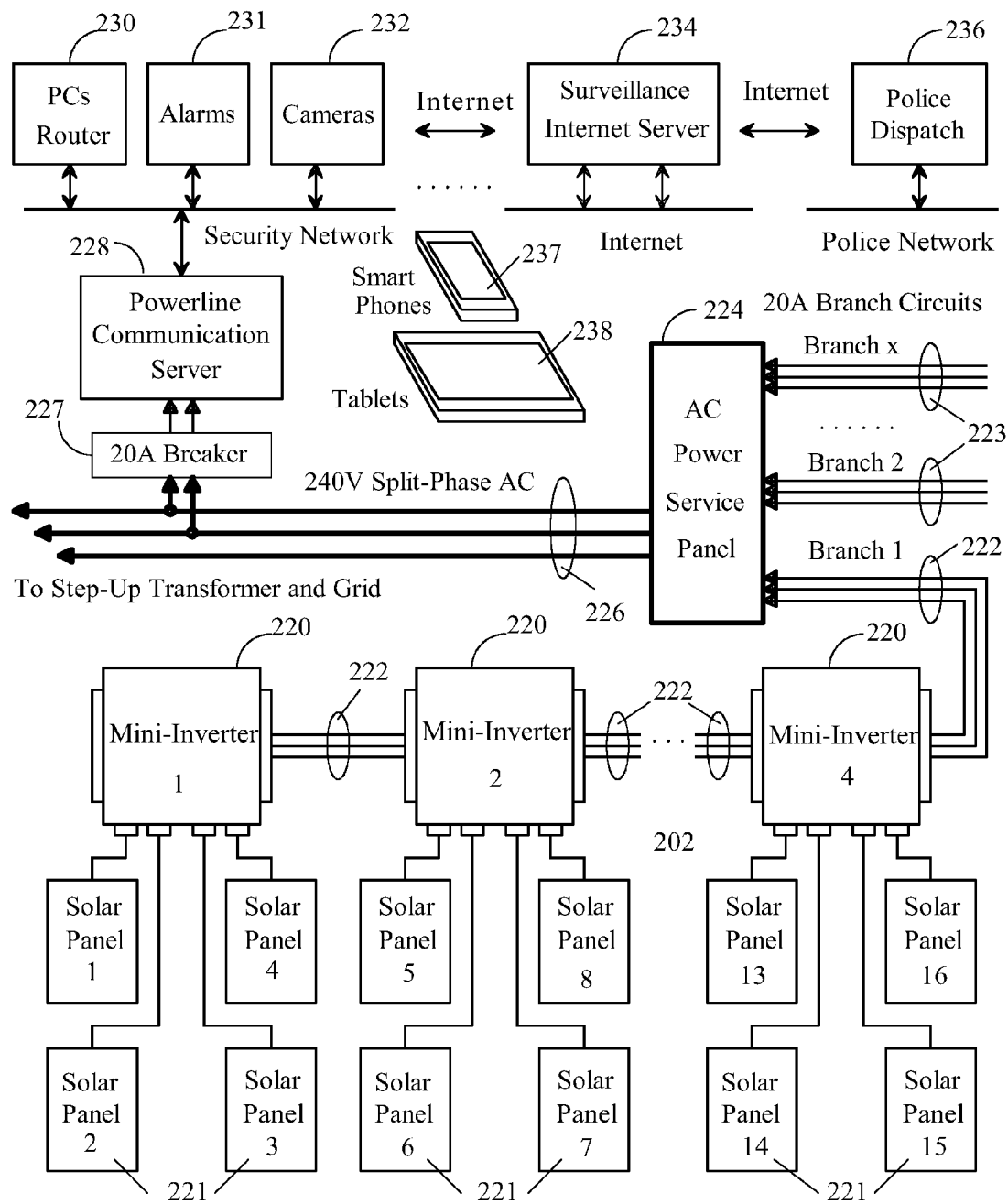

FIG. 5 is a block diagram illustrating a commercial-scale solar power system that includes a number of 20 A AC branch circuits combined in an AC power service panel. Each of the AC branch circuits receives AC power from four daisy-chained 4-channel solar power Mini-Inverters, each of which communicates with a surveillance system in real-time during the day and night through a powerline communication server according to an embodiment of this invention.

Figure 6:
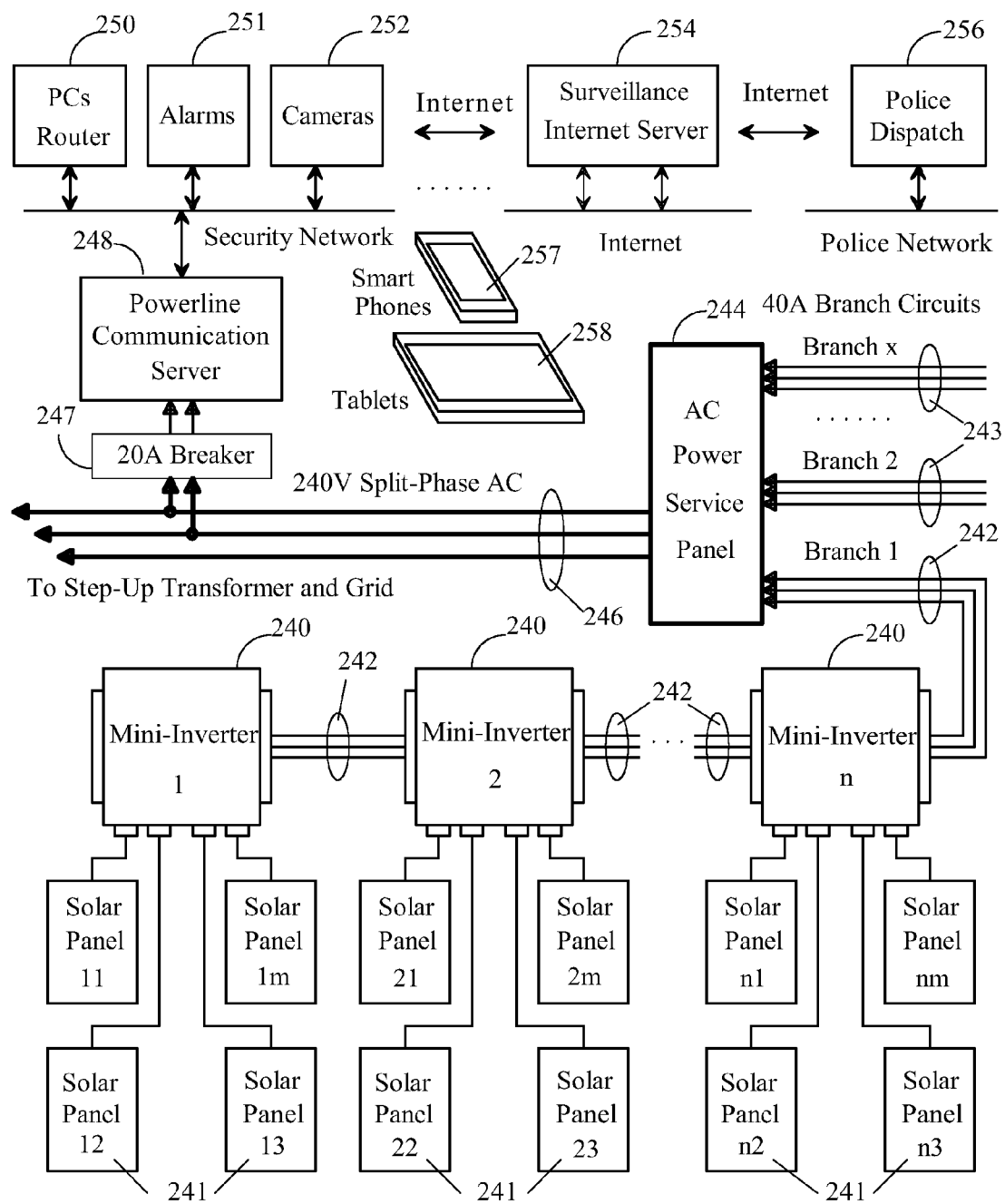

FIG. 6 is a block diagram illustrating a utility-scale solar power system that includes a number of 40 A AC branch circuits combined in an AC power service panel. Each of the AC branch circuits receives AC power from n daisy-chained m-channel solar power Mini-Inverters, each of which communicates with a surveillance system in real-time during the day and night through a powerline communication server according to an embodiment of this invention.

Figure 7:
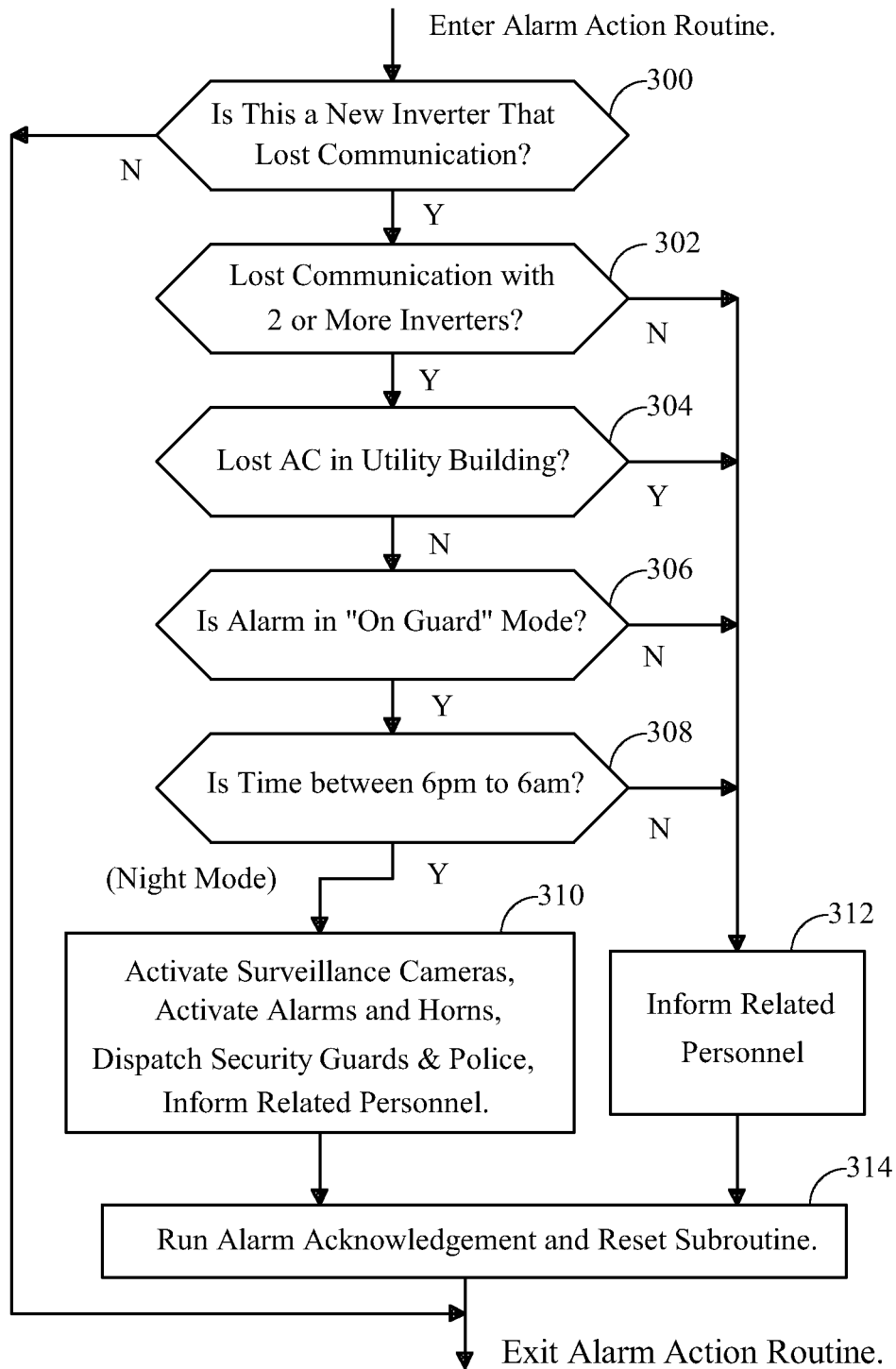

FIG. 7 is a flow chart describing the Surveillance Action Routine running inside the powerline communication gateway or server according to an embodiment of this invention.

The term "mechanism" is used herein to represent hardware, software, or any combination thereof. The term "solar module" or "solar panel" refers to photovoltaic (PV) solar modules. The term "AC load" is used herein to represent one or more single-phase or three-phase electrical devices including but not limited to motors, pumps, fans, lights, appliances, and homes. The term "solar power plant" or "solar farm" typically refers to a large commercial or utility-scale solar power system. The term "a powerline communication device" refers to a powerline communication gateway, or a powerline communication server, or a device that enables powerline communications.

Throughout this document, m=1, 2, 3, . . . , as an integer, which is used to indicate the number of the DC input ports of a Mini-Inverter. The term "input channel" refers to the DC input port of the Mini-Inverter. Then, an m-channel Mini-Inverter means that the Mini-Inverter has m input channels or m DC input ports.

Throughout this document, n=1, 2, 3, . . . , as an integer, which is used to indicate the number of Mini-Inverters that daisy chain or connect in parallel in an AC branch circuit.

Throughout this document, x=1, 2, 3, . . . , as an integer, which is used to indicate the number of AC branch circuits in a solar power plant.

Throughout this document, if a solar power inverter or a solar power plant is used to generate single-phase AC, it can also be applied to three-phase AC without departing from the spirit or scope of our invention. If a solar power inverter or a solar power plant is used to generate three-phase AC, it can also be applied to single-phase AC without departing from the spirit or scope of our invention.

Without losing generality, all numerical values given in this patent are examples. Other values can be used without departing from the spirit or scope of our invention. The description of specific embodiments herein is for demonstration purposes and in no way limits the scope of this disclosure to exclude other not specially described embodiments of this invention.

DESCRIPTION

The solar power industry has been growing rapidly. Solar power plants, especially those commercial and utility-scale ones, are often located in rural areas covering a large expanse of land. If not well guarded, a solar power plant can be an easy target for vandalism, which can result in big losses in equity and revenue. In order to protect a solar power plant, people typically build fences, install surveillance cameras, and hire security guards to guard the property. All these efforts can be costly.

In a solar power system, solar panels and inverters work together to collect solar energy and convert it into usable electricity. A grid-interactive solar power inverter inverts the DC power generated by solar panels to AC power feeding the electric grid. Since a solar power inverter is a smart device that can communicate with the outside world through powerline and digital networks, surveillance features can be built inside the solar power inverter to enable low cost yet reliable surveillance capabilities. More specifically, the solar power inverter can be designed so that it reports its existence and status in real-time at all times to a secured powerline communication server or gateway device. When communication with one or more inverters is lost for no good reason, an alarm and a sequence of surveillance actions can be generated.

In most cases, if a thief removes the inverter by disconnecting or cutting the AC powerline, the inverter will not be able to communicate with the secured powerline communication server since it requires the powerline to transfer signals. This can easily trigger an alarm. Most solar power inverters cannot be monitored at night because they must shutdown due to the loss of power. Therefore, the key is to design the inverter so that, during the night, it (i) stays on, (ii) consumes very little power, and (iii) keeps the communication going.

Most of today's solar power inverters are designed based on switching power supply techniques and include power electronic circuits, digital microcontroller circuits, communication circuits, etc. These circuits require DC power in order to work. For instance, a digital microcontroller typically needs 3.3V DC power. The switching power supply circuits include MOSFETs and MOSFET drivers, where the MOSFET drivers typically require 12V-15V DC to operate. A powerline communication MODEM requires 15V DC to work. Therefore, a solar power inverter typically consists of internal DC power supplies that can provide DC power at 3.3V, 5V, and 15V to its internal electronic circuits and components.

Where does the input power for these internal DC power supplies come from? As described in the U.S. patent application Ser. No. 13/397,402 and Ser. No. 13/493,622, a grid-interactive solar power inverter or an off-grid solar power inverter can be designed to include an internal DC power supply to take power from the connected solar panel(s) and provide proper DC power to its internal electronic circuits. This design, however, has a major limitation. It cannot supply DC power when there is no sunlight at night while the surveillance alarms are needed the most.

A grid-interactive solar power inverter is connected to the AC powerline. As described in the U.S. patent application Ser. No. 12/837,162, a solar power inverter can be designed to include an internal DC power supply that can take AC power from the grid, invert the AC to DC power, and supply the appropriate DC voltages to power the internal electronic circuits. This design has a major weakness. If the DC power is needed to power the MOSFET drivers for the inverter to generate AC power, the DC power supply has to be designed to include a AC-to-DC inverter sufficient enough to power the MOSFET drivers. This design will be more complex and costly compared to a DC power supply that takes DC power from the solar panels. To conclude, a DC power supply with DC input is much simpler and cost effective to design and implement than a DC power supply with AC input.

To overcome the shortcomings of both designs, a novel hybrid DC power supply design is described in the following.

Figure 1:
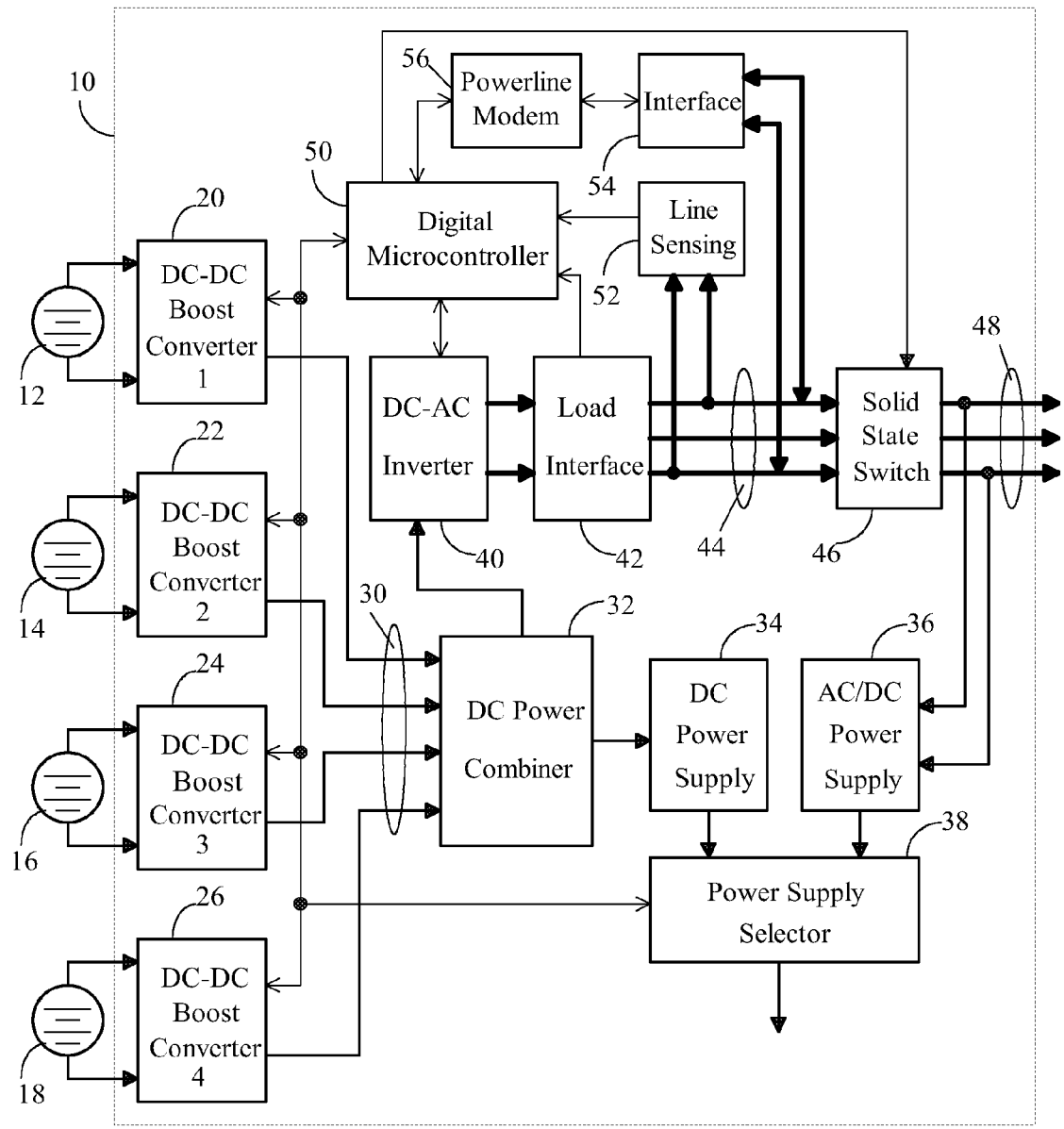
FIG. 1 is a block diagram illustrating a 4-channel grid-interactive solar power Mini-Inverter that inverts the DC power from 4 solar panels to AC power and communicates with a powerline communication gateway or server to report its status at all times according to an embodiment of this invention.

FIG. 1 is a block diagram illustrating a 4-channel grid-interactive solar power Mini-Inverter that inverts the DC power from 4 solar panels to AC power and communicates with a powerline communication gateway or server to report its status at all times according to an embodiment of this invention.

The 4-channel solar power Mini-Inverter 10 is connected to 4 solar panels 12, 14, 16, 18 as DC sources. The inverter comprises 4 DC-DC boost converters 20, 22, 24, 26, a DC power combiner 32, a DC power supply 34, an AC/DC power supply 36, a power supply selector 38, a DC-AC inverter 40, a load interface circuit 42, an internal AC powerline 44, a solid-state switch circuit 46, an external AC powerline 48 that connects to the grid, a digital microcontroller 50, a line sensing circuit 52, an interface circuit for powerline communications 54, and a powerline communications Modem 56.

As mentioned earlier, the term "channel" or "input channel" refers to the DC input port of the Mini-Inverter. Without losing generality, an input channel may comprise a DC-DC boost converter, measurement circuits, supporting circuits, and cables and connectors to connect to a solar panel. A 4-channel Mini-Inverter means that the Mini-Inverter has 4 input channels.

During normal operating conditions where there is sufficient sunlight, the power from solar panels 12, 14, 16, 18 is delivered to the corresponding DC-DC boost converters 20, 22, 24, 26, respectively. The DC power is combined in the DC power combiner 32. The total combined DC power is then inverted by the DC-AC inverter 40 to AC power with a voltage higher than the incoming AC voltage. The generated AC power goes through the load interface circuit 42 to be combined with the AC power in the internal AC powerline 44. A solid-state switch 46 controlled by the digital microcontroller 50 is used to isolate the internal AC powerline 44 from the external AC powerline 48. A line sensing circuit 52 connected to the internal AC powerline 44 is used to detect the phase and zero-crossing point of the incoming AC power from the power grid. The phase and zero-crossing point signals are sent to the digital microcontroller 50 for AC power synchronization to assure that the power inverter provides high quality synchronized power to the grid. A powerline communications Modem 56, which is isolated by an interface circuit 54, is used to establish a 2-way digital signal communication between the digital microcontroller 50 and the outside world through the AC powerline.

When the solar power inverter is generating AC power, the digital microcontroller 50 controls the power supply selector 38 to select the DC power supply 34 to provide DC power to the internal electronic circuits. The input power is provided by one of the solar panels through its corresponding DC converter and the DC combiner 32. The power supply selector 38 used in this embodiment as well as those to be described in FIGS. 2 and 3 can be designed with a driving circuit and analog switching devices such as relays, FETs, and MOSFETs, etc.

Before the solar power inverter is about to shutdown when it detects that the DC input power is below a predetermined value, the inverter will enter a night mode. The digital microcontroller 50 will select the AC/DC power supply 36 to provide DC power to only a portion of the internal electronic circuits that enable powerline communications including the digital microcontroller 50, interface circuit 54, powerline Modem 56, and supporting circuits. This means, regardless if there is sunlight or not, the solar power inverter 10 can keep communicating with the outside world unless the inverter loses connection to the AC powerline. In this case, something abnormal has likely happened. A secured powerline monitoring device can immediately trigger surveillance alarms and actions.

Figure 2:
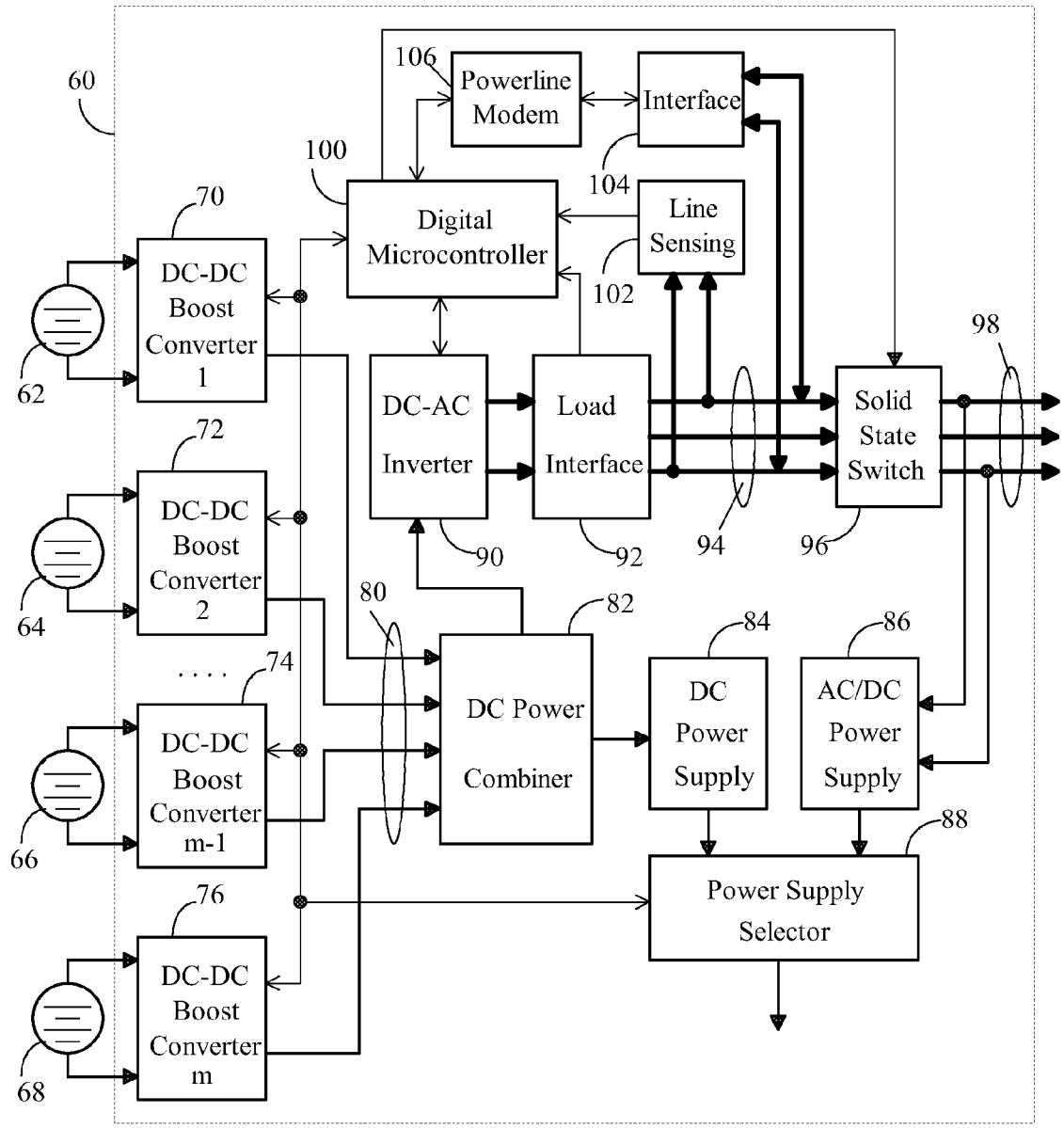
FIG. 2 is a block diagram illustrating an m-channel grid-interactive solar power Mini-Inverter that inverts the DC power from m solar panels to AC power and communicates with a powerline communication gateway or server to report its status at all times according to an embodiment of this invention.
Figure 3:
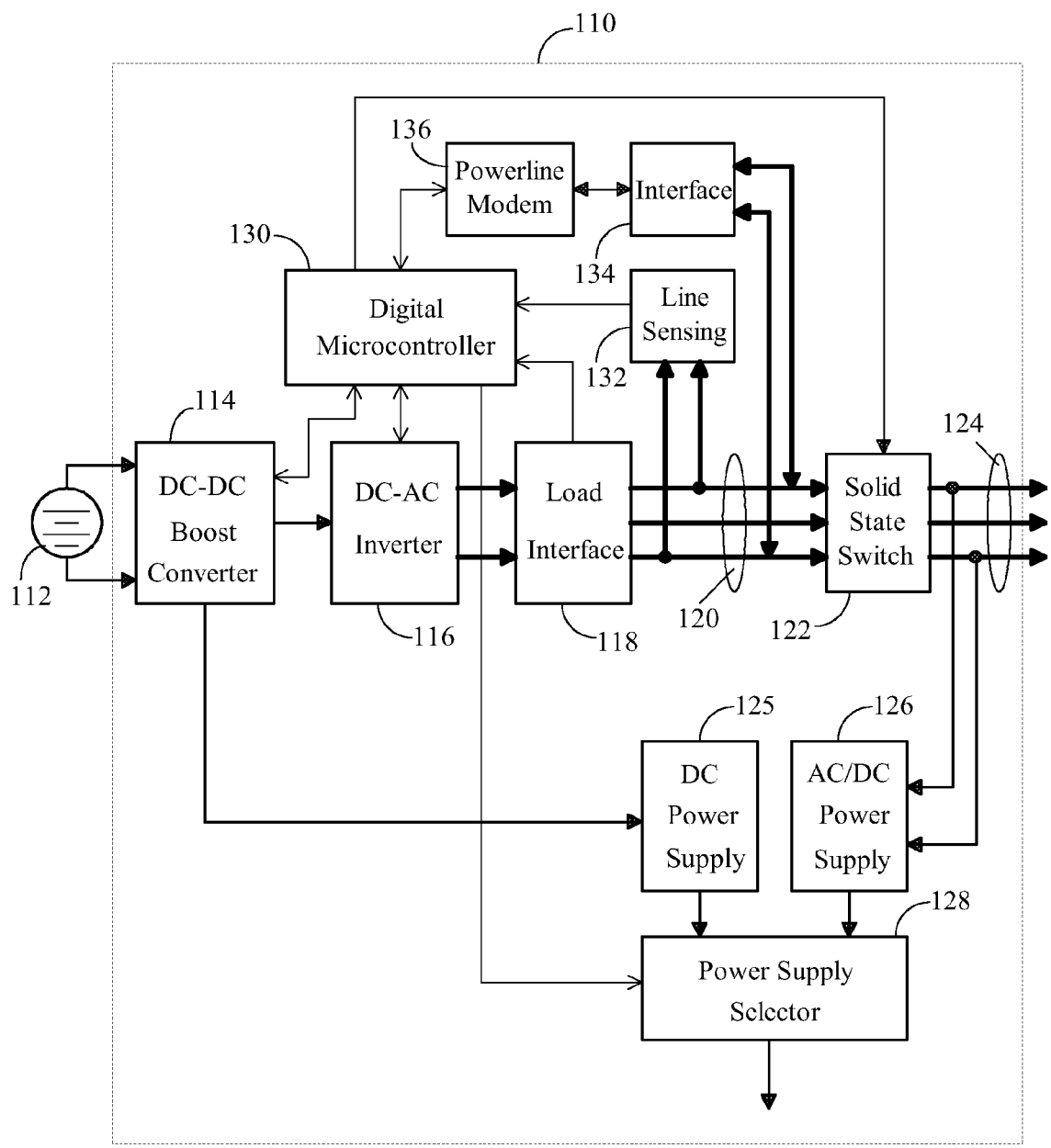
FIG. 3 is a block diagram illustrating a single channel grid-interactive solar power inverter that inverts the DC power from a solar panel to AC power and communicates with a powerline communication gateway or server to report its status at all times according to an embodiment of this invention.

Since the AC/DC power supply 36 as well as those to be described in FIGS. 2 and 3 is required to supply power only to the internal electronic circuits that enable powerline communications, it can be designed by using a small and commercially available AC-DC inverter IC (integrated circuit) and supporting circuits. This makes the disclosed hybrid DC power supply design useful and affordable.

The digital microcontroller 50 as well as those to be described in FIGS. 2 and 3 are used to perform a number of tasks including (i) monitoring the DC boost voltage from each DC-DC boost converter, (ii) controlling the DC-DC boost converters, (iii) measuring input voltage and current, and calculating DC input power for each channel, (iv) performing maximum power point tracking (MPPT) for each solar panel, (v) performing DC-AC inversion, AC power synchronization, and AC output current control, (vi) monitoring AC current and voltage for generated power amount and status, (vii) performing powerline communications, (viii) performing logic controls such as AC powerline switching and isolation, (ix) selecting the DC power supply or AC/DC power supply based on the DC input power, and (x) keeping real-time powerline communication with the outside world at all times.

FIG. 2 is a block diagram illustrating an m-channel grid-interactive solar power Mini-Inverter that inverts the DC power from m solar panels to AC power and communicates with a powerline communication gateway or server to report its status at all times according to an embodiment of this invention.

The m-channel solar power Mini-Inverter 60 is connected to m solar panels 62, 64, 66, 68 as DC sources. The Mini-Inverter comprises m DC-DC boost converters 70, 72, 74, 76, a DC power combiner 82, a DC power supply 84, an AC/DC power supply 86, a power supply selector 88, a DC-AC inverter 90, a load interface circuit 92, an internal AC powerline 94, a solid-state switch circuit 96, an external AC powerline 98 that connects to the grid, a digital microcontroller 100, a line sensing circuit 102, an interface circuit for powerline communications 104, and a powerline communications Modem 106.

During normal operating conditions where there is sufficient sunlight, the power from solar panels 62, 64, 66, 68 is delivered to the corresponding DC-DC boost converters 70, 72, 74, 76, respectively. The DC power is combined in the DC power combiner 82. The total combined DC power is then inverted by the DC-AC inverter 90 to AC power with a voltage higher than the incoming AC voltage. The generated AC power goes through the load interface circuit 92 to be combined with the AC power in the internal AC powerline 94. A solid-state switch 96 controlled by the digital microcontroller 100 is used to isolate the internal AC powerline 94 from the external AC powerline 98. A line sensing circuit 102 connected to the internal AC powerline 94 is used to detect the phase and zero-crossing point of the incoming AC power from the power grid. The phase and zero-crossing point signals are sent to the digital microcontroller 100 for AC power synchronization to assure that the Mini-Inverter provides high quality synchronized power to the grid. A powerline communications Modem 106, which is isolated by an interface circuit 104, is used to establish a 2-way digital signal communication between the digital microcontroller 100 and the outside world through the AC powerline.

When the solar power inverter is generating AC power, the digital microcontroller 100 controls the power supply selector 88 to select the DC power supply 84 to provide DC power to the internal electronic circuits. The input power is provided by one of the solar panels through its corresponding DC converter and the DC combiner 82.

Before the solar power inverter is about to shutdown when it detects that the DC input power is below a predetermined value, the inverter will enter a night mode. The digital microcontroller 100 will select the AC/DC power supply 86 to provide DC power to a portion of the internal electronic circuits including the digital microcontroller 100, interface circuit 94, powerline Modem 96, and supporting circuits. This means, regardless if there is sunlight or not, the solar power inverter 60 can keep communicating with the outside world unless the inverter loses connection to the AC powerline. In this case, something abnormal has likely happened. A secured powerline monitoring device can immediately trigger surveillance alarms and actions.

FIG. 3 is a block diagram illustrating a single channel grid-interactive solar power inverter that inverts the DC power from a solar panel to AC power and communicates with a powerline communication gateway or server to report its status at all times according to an embodiment of this invention.

The single channel solar power inverter 110 is connected to a solar panel 112 as DC source. The inverter comprises a DC-DC boost converter 114, a DC power supply 125, an AC/DC power supply 126, a power supply selector 128, a DC-AC inverter 116, a load interface circuit 118, an internal AC powerline 120, a solid-state switch circuit 122, an external AC powerline 124 that connects to the grid, a digital microcontroller 130, a line sensing circuit 132, an interface circuit for powerline communications 134, and a powerline communications Modem 136.

During normal operating conditions where there is sufficient sunlight, the power from solar panel 112 is delivered to the corresponding DC-DC boost converter 114. The DC power is then inverted by the DC-AC inverter 116 to AC power with a voltage higher than the incoming AC voltage. The generated AC power goes through the load interface circuit 118 to be combined with the AC power in the internal AC powerline 120. A solid-state switch 122 controlled by the digital microcontroller 130 is used to isolate the internal AC powerline 120 from the external AC powerline 124. A line sensing circuit 132 connected to the internal AC powerline 120 is used to detect the phase and zero-crossing point of the incoming AC power from the power grid. The phase and zero-crossing point signals are sent to the digital microcontroller 130 for AC power synchronization to assure that the Mini-Inverter provides high quality synchronized power to the grid. A powerline communications Modem 136, which is isolated by an interface circuit 134, is used to establish a 2-way digital signal communication between the digital microcontroller 130 and the outside world through the AC powerline.

When the solar power inverter is generating AC power, the digital microcontroller 130 controls the power supply selector 128 to select the DC power supply 125 to provide DC power to the internal electronic circuits. The input power is provided by the solar panel 112 through its corresponding DC converter 114.

Before the solar power inverter is about to shutdown when it detects that the DC input power is below a predetermined value, the inverter will enter a night mode. The digital microcontroller 130 will select the AC/DC power supply 126 to provide DC power to a portion of the internal electronic circuits including the digital microcontroller 130, interface circuit 134, powerline Modem 136, and supporting circuits. This means, regardless if there is sunlight or not, the solar power inverter 110 can keep communicating with the outside world unless the inverter loses connection to the AC powerline. In this case, something abnormal has likely happened. A secured powerline monitoring device can immediately trigger surveillance alarms and actions.

FIG. 4 is a block diagram illustrating a residential-scale solar power system where four 4-channel solar power Mini-Inverters daisy chain, each of which inverts the DC power from the solar panels to AC power feeding the electric grid, and also communicates with a surveillance system through a powerline communication gateway over the AC powerline to report its status in real-time at all times according to an embodiment of this invention.

The solar power system comprises four solar power Mini-Inverters 200, each of which is connected with four solar panels 201 and inverts the DC power from the solar panels to AC power. All Mini-Inverters daisy chain or connect in parallel through the AC powerline 202. Its AC output power is delivered to the power grid through the power service panel 204 and AC powerline 206. The solar power system is guarded by an online surveillance system that may include one or more of the following items: a powerline communication gateway 208, a PC computer and a network router 210, alarms 211, surveillance cameras 212, a surveillance internet server 214, police dispatch service 216, Internet and Internet devices such as smart phones 217 and tablets 218. All these devices can work automatically day and night without the need of human interventions.

The powerline communication gateway 208 is connected to the AC powerline 202. For a split-phase powerline, the gateway connects to a hotline L1 or L2, and ground. For a single-phase powerline, the gateway connects to the hotline or neutral line, and ground. For a three-phase powerline, the gateway connects to any one of the three hotlines, and ground.

Installed inside the residential home or a commercial building, the powerline communication gateway cannot be stolen easily since breaking inside the home or building will trigger security alarms that are monitored by an alarm company. The powerline communication gateway can be designed to include the following features: (i) powerline communications with the Mini-Inverters, (ii) WiFi to communicate with wireless devices such as smart phones, (iii) Web server to host dynamic Web pages, and (iv) digital network to connect to other computers and Internet devices. The gateway communicates with all the solar power Mini-Inverters connected on the AC powerline 202 in real-time at all times. It can also provide the status of all Mini-Inverters to the outside world through wired and wireless networks. As shown in FIG. 4, the gateway 208 connects to a PC computer through Ethernet. The computer can manage and activate all necessary surveillance actions. Once it loses communication with one or more Mini-Inverters, it will trigger an alarm.

During the day, this alarm may just trigger messages and e-mails to be sent to the assigned personnel. During the night, if the system detects that it loses communication with multiple solar power Mini-Inverters, it is reasonable to believe that an abnormal event has happened. Then, it may immediately launch a number of surveillance actions including but not limited to (i) activating surveillance cameras, (ii) sounding alarms and horns, (iii) informing security guards, (iv) dispatching police, and (v) sending messages and e-mails to assigned personnel.

FIG. 5 is a block diagram illustrating a commercial-scale solar power system that includes a number of 20 A AC branch circuits combined in an AC power service panel, each of the AC branch circuits receives AC power from four daisy-chained 4-channel solar power Mini-Inverters, each of which communicates with a surveillance system in real-time during the day and night through a powerline communication server according to an embodiment of this invention.

The commercial-scale solar power system comprises multiple 20 A AC branch circuits, 1, 2, . . . , x. Branch circuit 1 comprises four 4-channel solar power Mini-Inverters 220, each of which is connected with four solar panels 221 and inverts the DC power from the solar panels to single-phase or three-phase AC power. All Mini-Inverters daisy chain or connect in parallel through the AC powerline 222 and sends the output power to AC power service panel 224. Other AC branch circuits may include the same or different number and type of solar power Mini-Inverters and/or single-channel solar power inverters. The AC power from all AC branch circuits 222 and 223 is combined in the AC power service panel 224 and then delivered to the power grid through the main AC powerline 226. If there are ten 20 A AC branch circuits, the main AC powerline will have 200 A current.

A powerline communication server 228 is connected to the main AC powerline 226 through a 20 A breaker 227. Since the powerline communication server 228 is a low power device, it is necessary to use a breaker to isolate it from the main high-current AC powerline. For a split-phase powerline, the server connects to a hotline L1 or L2, and ground. For a single-phase powerline, the server connects to the hotline or neutral line, and ground. For a three-phase powerline, the server connects to any one of the three hotlines, and ground. The powerline communication server 228 can communicate with all solar power Mini-Inverters or solar power inverters from AC branch circuits 1 to x, and monitor their status in real-time. This is a reliable and powerful communication scheme that enables online surveillance for the solar power system.

The solar power system is guarded by an online surveillance system that may include one or more of the following items: the powerline communication server 228, a PC computer and a network router 230, alarms 231, surveillance cameras 232, a surveillance internet server 234, police dispatch service 236, Internet and Internet devices such as smart phones 237 and tablets 238. All these devices can work automatically day and night without the need of human interventions.

Installed inside a commercial building or a locked electrical panel, the powerline communication server 228 cannot be stolen easily since breaking inside the building or electrical panel will trigger security alarms that are monitored by an alarm company. The powerline communication server can be designed to include the following features: (i) powerline communications with a large number of solar power inverters, (ii) WiFi to communicate with wireless devices such as smart phones, (iii) a Web server to host dynamic Web pages, and (iv) a digital network to connect to other computers and Internet devices. The powerline communication server communicates with all the solar power inverters connected through the main AC powerline in real-time at all times. It can also provide the status of all the inverters to the outside world through wired and wireless networks. As shown in FIG. 5, the server 228 connects to a PC computer through Ethernet. The computer can manage and activate all necessary surveillance actions. Once it loses communication with one or more solar power inverters, it will trigger an alarm.

During the day, this alarm may just trigger messages and e-mails to be sent to the assigned personnel. During the night, if the system detects that it loses communication with multiple solar power inverters, it is reasonable to believe that an abnormal event has happened. Then, it may immediately launch a number of surveillance actions including but not limited to (i) activating surveillance cameras, (ii) sounding alarms and horns, (iii) informing security guards, (iv) dispatching police, and (v) sending messages and e-mails to assigned personnel.

FIG. 6 is a block diagram illustrating a utility-scale solar power system that includes a number of 40 A AC branch circuits combined in an AC power service panel, each of the AC branch circuits receives AC power from n daisy-chained m-channel solar power Mini-Inverters, each of which communicates with a surveillance system in real-time during the day and night through a powerline communication server according to an embodiment of this invention.

The utility-scale solar power system comprises multiple 40 A AC branch circuits, 1, 2, . . . , x. Branch circuit 1 comprises n m-channel solar power Mini-Inverters 240, each of which is connected with m solar panels 241 and inverts the DC power from the solar panels to single-phase or three-phase AC power. All Mini-Inverters daisy chain or connect in parallel through the AC powerline 242 and sends the output power to AC power service panel 244. Other AC branch circuits may include the same or different number and type of solar power Mini-Inverters and/or single-channel solar power inverters. The AC power from all AC branch circuits 242 and 243 is combined in the AC power service panel 244 and then delivered to the electrical grid through the main AC powerline 246. If there are thirty-two 40 A AC branch circuits, the main AC powerline will have 32×40 A=1280 A current. In this case, if each Mini-Inverter is rated at 1 KW, each 40 A branch circuit can include 8 Mini-Inverters. Then, this solar power plant will have 8×32=256 Mini-Inverters to produce a total of 250 KW or 0.25 MW power. A 1 MW solar power plant will have 4 of these 0.25 MW solar power systems.

A powerline communication server 248 is connected to the main AC powerline 246 through a 20 A breaker 247. Since the powerline communication server 248 is a low power device, it is necessary to use a breaker to isolate it from the main high-current AC powerline. For a split-phase powerline, the server connects to a hotline L1 or L2, and ground. For a single-phase powerline, the server connects to the hotline or neutral line, and ground. For a three-phase powerline, the server connects to any one of the three hotlines, and ground. The powerline communication server 248 can be designed so that it can communicate with all 256 solar power Mini-Inverters. For a 1 MW solar power plant, four powerline communication servers are required. Each one can communicate with its corresponding 256 Mini-Inverters. In this case, filters may be required to isolate these four 0.25 MW solar power sub-systems. If no filters are used, these four powerline communication servers can still communicate with their corresponding Mini-Inverters as long as only one is active and other three are waiting. This is really a reliable and powerful communication scheme that enables online surveillance for a utility-scale solar power plant.

The solar power system is guarded by an online surveillance system that may include one or more of the following items: the powerline communication server 248, a PC computer and a network router 250, alarms 251, surveillance cameras 252, a surveillance internet server 254, police dispatch service 256, Internet and Internet devices such as smart phones 257 and tablets 258. All these devices can work automatically day and night without the need of human interventions.

For a utility-scale solar power plant, a small and fenced utility building is a good place to install the powerline communication servers, computers, routers, and other instruments. Universal power supplies (UPS) can be used to provide power when the whole facility loses AC power. The servers communicate with all the solar power inverters connected through the main AC powerline in real-time at all times. It can also provide the status of all the inverters to the outside world through wired and wireless networks. Working with the powerline communication servers, the computers can manage and activate all necessary surveillance actions.

FIG. 7 is a flow chart describing an Alarm Action Routine running inside the powerline communication gateway or server according to an embodiment of this invention.

When the powerline communication gateway or server detects that it has lost communication with an inverter, it enters the Alarm Action Routine right away.

At Block 300, the program checks to see if it is a new inverter that has just lost communication with the gateway or server. If the answer is No, it means it is an inverter that has already been recorded and reported. It will exit the Alarm Action Routine. If the answer is Yes, the program proceeds to Block 302 to check if the system lost communication with 2 or more inverters. If the answer is No, it suggests that it is likely a malfunctioning inverter, then the program goes to Block 312 to send a message and/or e-mail to inform related personnel. If the answer is Yes, the program proceeds to Block 304 to check if the utility building has lost AC power. If the answer is Yes, it will go to Block 312 to send a message or e-mail to inform related personnel. If the answer is No, it will go to Block 306 and check if the alarm is in "On Guard" mode or not. If the answer is Yes, it will check if the time is between 6 pm to 6 am. If the answer is Yes, the program concludes that multiple inverters have just lost communication at night while the grid AC is still on, indicating something abnormal has happened. Surveillance actions will be immediately launched at Block 310, which may include one or more of the following actions: (i) activating surveillance cameras, (ii) sounding alarms and horns, (iii) informing security guards, (iv) dispatching police, and (v) sending messages and e-mails to assigned personnel.

When the program leaves Block 310 and 312, it will enter Block 314 to run an Alarm Acknowledgement and Reset Subroutine. This should require the plant personnel to acknowledge and reset the alarms. After that, the program exits the Alarm Action Routine.

The alarm detection logics and surveillance actions can be designed in various ways. The described alarm detection logics and surveillance actions are only examples for demonstration purposes.

To summarize, the disclosed online surveillance scheme can be designed as part of the features and capabilities that the solar power inverters and the supporting communication devices and software offer. It provides a reliable and low cost surveillance solution for small or large solar power systems. More significantly, this approach can help reduce the total installed cost for large commercial and utility-scale solar power plants while providing the security and surveillance that the developers, bankers, and insurance companies look for. It can have a positive impact on the solar power industry.

The invention claimed is:

1. A method of providing online surveillance to protect a solar power plant with solar panels and solar power inverters, comprising:
 a) enabling the solar power inverters to keep powerline communication with a powerline communication device;
 b) monitoring the status of the solar power inverters in real-time; and
 c) triggering surveillance alarms and actions when a predetermined number of the solar power inverters are detected to lose the communication at a plurality of preselected times;
 wherein each of the solar power inverters comprises:
  i) at least two DC input channels, each of which comprises a DC-DC boost converter, measurement circuits, supporting circuits, and cables and connectors to connect to a solar panel;
  ii) an AC power output port arranged to supply AC power to the electric grid through an external AC powerline;
  iii) a DC power combiner connected to said DC-DC boost converters for combining the DC output from all DC-DC boost converters;
  iv) a DC power supply connected to the DC power combiner, an AC/DC power supply connected to the external AC powerline, and a power supply selector, arranged to work together and supply DC power to internal electronic circuits of the inverter either by the DC power supply with input power from one or more solar panels or by the AC/DC power supply with input power from the grid through the external AC powerline; and
  v) a digital microcontroller connected to the DC-DC boost converters and the power supply selector, said digital microcontroller arranged to measure input voltage and current to calculate DC input power for each input channel, constructed to run the inverter in a normal mode or a night mode based on calculated DC input power; and keep powerline communication of the inverter to the outside world as long as the inverter is connected to the external AC powerline.

2. An online surveillance system for protecting a solar power plant, comprising:
 a) one or more solar power inverters connected to one or more solar panels through DC input channels, said one or more solar power inverters also being connected to an AC powerline for delivering AC power to the electric grid;
 b) an AC power service panel configured to combine one or more AC power branch circuits and deliver AC power to the electric grid through a main AC powerline, each said branch circuit being connected with a plurality of solar power inverters and solar panels;
 c) one or more powerline communication devices, connected to an AC branch circuit or the main AC powerline isolated by a circuit breaker, each said powerline communication device being configured to communicate with a plurality of preselected solar power inverters through the AC powerline; and
 d) one of more computers, network routers, alarms, cameras, Internet, Internet servers, Internet terminal devices, and police dispatch service stations, configured to activate surveillance alarms and actions when a predetermined number of solar power inverters are detected to lose the communication at a plurality of preselected times;
 wherein each of the one or more solar power inverters comprises:
  i) at least two DC input channels, each of which comprises a DC-DC boost converter, measurement circuits, supporting circuits, and cables and connectors to connect to a solar panel;
  ii) an AC power output port arranged to supply AC power to the electric grid through an external AC powerline;
  iii) a DC power combiner connected to said DC-DC boost converters for combining the DC output from all DC-DC boost converters;
  iv) a DC power supply connected to the DC power combiner, an AC/DC power supply connected to the external AC powerline, and a power supply selector, arranged to work together and supply DC power to internal electronic circuits of the inverter either by the DC power supply with input power from one or more solar panels or by the AC/DC power supply with input power from the grid through the external AC powerline; and v) a digital microcontroller connected to the DC-DC boost converters and the power supply selector, said digital microcontroller arranged to measure input voltage and current to calculate DC input power for each input channel, constructed to run the inverter in a normal mode or a night mode based on calculated DC input power; and keep powerline communication of the inverter to the outside world as long as the inverter is connected to the external AC powerline.

3. The surveillance system of claim 2, wherein said powerline communication device is a powerline communication gateway or a powerline communication server.

4. The surveillance system of claim 2, in which the said powerline communication device is programmed with an alarm action routine to iteratively:

a) upon the detecting the loss of communication with one of solar power inverters, check if it is a new solar power inverter that has just lost the communication;
b) if a) is negative, exit;
c) if a) is positive, check if the system lost communication with 2 or more inverters;
d) if c) is negative, send a message to inform related personnel and exit;
e) if c) is positive, check if the utility room has lost AC power;
f) if e) is positive, send a message to inform related personnel and exit;
g) if e) is negative, check if the alarm is in "On Guard" mode;
h) if g) is negative, send a message to inform related personnel and exit;
i) if g) is positive, check if the time is between a predetermined first and second time;
j) if i) is negative, send a message to inform related personnel and exit;
k) if i) is positive, perform one or more of activating surveillance cameras, sounding alarms or horns, informing security guards, dispatching police, and sending messages and e-mails to assigned personnel; and
l) run an Alarm Acknowledgement and Reset Subroutine.

* * * * *